No. 666,633. Patented Jan. 22, 1901.
L. C. FARMER.
KETTLE OR DISH CLEANER, &c.
(Application filed Mar. 7, 1899.)

(No Model.)

Witnesses.
C. F. Kilgore
J. R. Godfrey

Inventor
Luther C. Farmer
By Frederick Thyne
his attorney

United States Patent Office.

LUTHER C. FARMER, OF MINNEAPOLIS, MINNESOTA.

KETTLE OR DISH CLEANER, &c.

SPECIFICATION forming part of Letters Patent No. 666,633, dated January 22, 1901.

Application filed March 7, 1899. Serial No. 708,086. (No model.)

*To all whom it may concern:*

Be it known that I, LUTHER C. FARMER, a citizen of the United States of America, residing in the city of Minneapolis, in the county of Hennepin and State of Minnesota, have invented certain new and useful Improvements in Kettle or Dish Cleaners, &c., of which the following is a specification.

My invention relates to kettle and dish cleaners and scrapers; and the object I have in view is to provide a device of simple, cheap, and durable construction by the use of which a person may readily and effectively clean and scrape not only the flat, but also the rounding, surfaces of kettles, pots, pans, and other cooking utensils after they have been used in cooking, and particularly to provide a device which when in use by a person will readily adjust itself to the position with respect to the hand of the person required to reach any desired portion of the surface of such utensil and to easily and thoroughly clean the same.

To this end my invention consists in the constructions and combinations of parts hereinafter described, and particularly pointed out in the claim, and will be readily understood by reference to the accompanying drawings, forming a part of this specification, in which—

Figure 1:
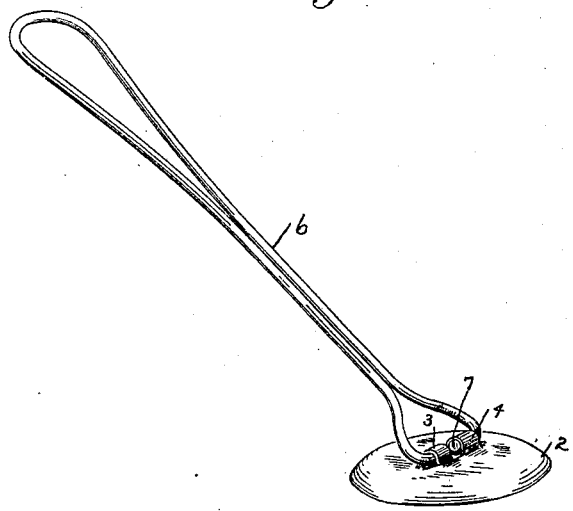
Figure 2:
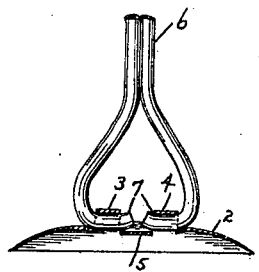

Figure 1 is a perspective view of a cleaner embodying my invention. Fig. 2 is a sectional view of the convex disk thereof.

As shown in the drawings, 2 represents a convex disk, which may be formed of any suitable material, preferably of sheet metal. This disk 2 has formed in its top the two upturned eyes or loops 3 4 and the depressed portion 5. A handle 6 of suitable material, preferably wire, as shown, has two inturned ends or prongs 7, adapted to slip under the upturned lips or eyes 3 4, respectively, and bear upon the depressed portion 5. The extreme inner ends of the prongs 7 abut. The ends or prongs 7 are normally held in the eyes 3 4 by the spring of the wire handle.

In use the operator, taking hold of the handle 6, inserts the disk 2 into the kettle or pot to be cleaned and forces the disk 2 over the surface thereof. The edge of the disk cuts or scrapes off the material clinging to the surface of the kettle. As the disk is pushed along the wall of the kettle its position with respect to the handle changes to conform to the slope of said wall. This action is produced by the loose pivotal connection between the handle and disk 2. It is thus seen that the disk readily assumes the various angles required to reach all portions of the surface of the kettle, and all portions thereof are readily thoroughly scraped and cleaned.

The action of the edge of the disk 2 rubbing against the surface of the kettle tends at all times to keep the edge of the disk 2 sharpened, owing to the peculiar concavo-convex shape of the disk 2.

Having thus described my invention, I claim as new and desire to secure by Letters Patent—

In a device of the class described, the combination, with a concavo-convex disk of sheet metal, provided with a loop struck up from said disk, of a wire handle composed of a single piece of spring-wire bent substantially as shown and described, the ends of said handle adapted to slip into said loop and to be retained therein by the spring of said wire, substantially as described.

In testimony whereof I have hereunto set my hand at Minneapolis, Minnesota, United States of America, this 27th day of February, A. D. 1899.

LUTHER C. FARMER.

In presence of—
H. R. DREW,
FREDERICK S. LYON.